(12) United States Patent
Chang

(10) Patent No.: US 10,798,769 B2
(45) Date of Patent: Oct. 6, 2020

(54) METHOD AND DEVICE FOR MONITORING RADIO RESOURCE CONTROL PROCEDURE

(71) Applicant: SHARP KABUSHIKI KAISHA, Sakai, Osaka (JP)

(72) Inventor: Ningjuan Chang, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/067,653

(22) PCT Filed: Jan. 5, 2017

(86) PCT No.: PCT/CN2017/070274
§ 371 (c)(1),
(2) Date: Jul. 2, 2018

(87) PCT Pub. No.: WO2017/118399
PCT Pub. Date: Jul. 13, 2017

(65) Prior Publication Data
US 2019/0007991 A1   Jan. 3, 2019

(30) Foreign Application Priority Data

Jan. 6, 2016 (CN) .......................... 2016 1 0007343

(51) Int. Cl.
*H04W 4/00* (2018.01)
*H04W 76/19* (2018.01)
(Continued)

(52) U.S. Cl.
CPC ........... *H04W 76/19* (2018.02); *H04W 72/12* (2013.01); *H04W 84/042* (2013.01)

(58) Field of Classification Search
CPC .... H04W 72/12; H04W 76/19; H04W 84/042
See application file for complete search history.

(56) References Cited

U.S. PATENT DOCUMENTS

2008/0039094 A1* 2/2008 Jeong ................... H04W 76/10
455/436
2013/0039287 A1* 2/2013 Rayavarapu ........ H04W 68/005
370/329

(Continued)

FOREIGN PATENT DOCUMENTS

| EP | 1845749 A2 | 10/2007 |
|---|---|---|
| WO | 2015/065085 A1 | 5/2015 |

*Primary Examiner* — Minh Trang T Nguyen
(74) *Attorney, Agent, or Firm* — ScienBiziP, P.C.

(57) ABSTRACT

The present invention provides an RRC procedure monitoring method executed at a UE, and a corresponding UE. The method comprises: when the UE or a UE radio resource control (RRC) layer triggers an RRC connection resume procedure, starting an RRC connection resume procedure monitoring timer. The method further comprises: when the RRC connection resume procedure monitoring timer is running, if the UE or the UE RRC layer receives, from an evolved NodeB (eNB), an RRC connection resume message, an RRC connection resume rejecting message, or an RRC connection setup message or an upper layer aborts the RRC connection resume procedure or cell reselection occurs, then the UE or the UE RRC layer stops the UE RRC connection resume procedure monitoring timer and terminates the RRC connection resume procedure, wherein the RRC connection resume message comprises configuration information for resuming the RRC connection when the eNB and the UE store UE context.

8 Claims, 13 Drawing Sheets

(51) Int. Cl.
*H04W 72/12* (2009.01)
*H04W 84/04* (2009.01)

(56) References Cited

U.S. PATENT DOCUMENTS

| | | | |
|---|---|---|---|
| 2013/0208699 A1* | 8/2013 | Hakkinen | H04W 76/38 370/331 |
| 2013/0260740 A1* | 10/2013 | Rayavarapu | H04W 76/27 455/422.1 |
| 2016/0278150 A1 | 9/2016 | Jung et al. | |
| 2016/0294531 A1* | 10/2016 | Loehr | H04W 72/0413 |
| 2017/0034865 A1* | 2/2017 | Jung | H04W 76/10 |
| 2018/0352448 A1* | 12/2018 | Ryu | H04W 76/30 |

\* cited by examiner

METHOD AND DEVICE FOR MONITORING RADIO RESOURCE CONTROL PROCEDURE

TECHNICAL FIELD

The present invention relates to the technical field of wireless communication. More particularly, the present invention relates to an information configuration method, a base station and a user equipment for communication between devices.

BACKGROUND

With the extensive application of the Internet of Things and its terminal devices, it becomes crucial to address the matter of designing a wireless network technology adapted for the communication of the Internet of Things. The 3rd Generation Partnership Project (3GPP) is currently developing a new access system for the purpose of designing a wireless access technology with low complicity and low throughput to meet the needs of the wireless Internet of Things, and is called the Narrowband-Internet of Things (NB-IoT). The features of this access technology include: large-scale devices supporting low throughput; low latency sensitivity; ultra-low device cost; ultra-low power consumption; and optimized network architecture.

In the aspect of optimizing the network architecture, the current 3GPP introduces a solution called user plane solution, which is briefly described as follows:

1. After a user equipment (UE) accesses the network, a connection to the network side is established based on the conventional mechanism and data is transmitted over the established connection. As illustrated in FIG. 1, a radio resource control (RRC) connection is established, a data radio bearer (DRB) is established and security is established, and then data is transmitted where necessary.

2. In the conventional long term evolution (LTE) system, following the completion of data transmission between a UE and an evolved NodeB (eNB), the RRC connection is released, UE context is deleted, and the system enters an RRC idle state. Distinctively, in the user plane solution, following the completion of data transmission, the UE and the eNB suspend the RRC connection, and store the UE context. As illustrated in FIG. 1, the eNB notifies the UE that the RRC connection is suspended via RRC signaling, and stores the UE context.

3. As illustrated in FIG. 2, when the UE has uplink data to send or has downlink data to receive, the UE initiates an RRC connection resume procedure to the eNB. Since the UE and the eNB have stored UE context, this procedure can resume the RRC connection, and data transmission can be directly implemented, with no need to establish the DRB via an RRC reconfiguration procedure, and with no need to establish air interface security via a security setup procedure. One can see that in this manner, signaling overhead of the air interface is saved.

As described above, in the user plane solution, control signaling overhead during data transmission is reduced by introducing an RRC connection suspension/resume procedure. In this way, when the UE triggers an RRC connection resume procedure, how to monitor the RRC connection resume procedure is a problem to be addressed.

SUMMARY OF INVENTION

As described in the background, a new RRC connection resume procedure is introduced to the solution on the user plane. After the procedure is triggered, a UE needs to monitor whether this procedure is successfully completed or not. However, the RRC protocol of the present mechanism does not cover this issue. Therefore, this issue is the concern of the present invention, and is the problem that the present invention aims to solve.

The method according to the present invention is not limited to the Release 13 NB-IoT system described in the background. It is also applicable to other non-NB-IoT apparatuses and systems, such as machine type communication (MTC) scenario and the like.

In a first aspect of embodiments of the present invention, an RRC procedure monitoring method executed at a user equipment (UE) is provided. The method comprises: when the UE or a UE radio resource control (RRC) layer triggers an RRC connection resume procedure, starting an RRC connection resume procedure monitoring timer. The method further comprises: when the RRC connection resume procedure monitoring timer is running, if the UE or the UE RRC layer receives, from an evolved NodeB (eNB), an RRC connection resume message, an RRC connection resume rejecting message, or an RRC connection setup message or an upper layer aborts the RRC connection resume procedure or cell reselection occurs, the UE or the UE RRC layer stops the UE RRC connection resume procedure monitoring timer and terminates the RRC connection resume procedure, wherein the RRC connection resume message comprises configuration information for resuming the RRC connection when the eNB and the UE have stored UE context.

Optionally, the method further comprises: if the RRC connection resume procedure monitoring timer expires, considering, by the UE or the UE RRC layer, that the RRC connection resume procedure fails.

Optionally, the method further comprises: receiving a configuration message comprising a value of the timer from the eNB.

Optionally, the configuration message is a system information message and/or a UE dedicated RRC message and/or a medium access control (MAC) layer signaling message sent in a broadcast manner.

According to a second aspect of the present invention, a user equipment (UE) is provided, Wherein the UE is configured to monitor an RRC connection resume procedure. The UE comprises: an RRC connection resume procedure management unit, configured to trigger an RRC connection resume procedure; a timer management unit, configured to start an RRC connection resume procedure monitoring timer when the RRC connection resume procedure is triggered, wherein the RRC connection resume procedure management unit is further configured to do the following: when the RRC connection resume procedure monitoring timer is running, if the UE or the UE RRC layer receives, from an evolved NodeB (eNB), an RRC connection resume message, an RRC connection resume rejecting message, or an RRC connection setup message or an upper layer aborts the RRC connection resume procedure or cell reselection occurs, terminating the RRC connection resume procedure, wherein the RRC connection resume message comprises, if the eNB and the UE have stored UE context, configuration information for resuming the RRC connection; and the timer management unit is further configured to do the following: when the RRC connection resume procedure monitoring timer is running, if the UE or the UE RRC layer receives, from an evolved NodeB (eNB), an RRC connection resume message, an RRC connection resume rejecting message, or an RRC connection setup message or an upper layer aborts the RRC connection resume procedure or cell reselection occurs, stopping the UE RRC connection resume procedure monitoring timer.

Optionally, the UE further comprises: a receiving unit, configured to receive a configuration message comprising a value of the timer from the eNB.

With reference to the description and accompanying drawings hereinafter, the specific embodiments of the present invention are described in detail, and the manners in which the principle of the present invention is employed are indicated. It should be understood that the embodiments of the present invention are not limited in terms of scope. Within the spirit and scope defined by the appended claims, the embodiments of the present invention include various variations, modifications and equivalents.

The features described anchor illustrated with respect to a specific embodiment may be used in one or more other embodiments in the same or similar manner, or may be combined with the features in other embodiments, or may be used to replace the features in other embodiments.

It should be emphasized that the term "comprise/include" used herein in this text refer to existence of the features, whole pieces, steps or components, but do not exclude existence and addition of one or more other features, whole pieces, steps or components.

BRIEF DESCRIPTION OF DRAWINGS

More aspects of the present invention may be better understood with reference to the accompanying drawings hereinafter. The members in the accompanying drawings are not drawn according to the practical scale, and are only intended to reveal the principle of the present invention. For ease of illustration and description of some portions of the present invention, corresponding portions in the accompanying drawings may be scaled up or scaled down.

The elements and features in one accompanying drawing or embodiment may be combined with the elements and features in one or more other accompanying drawings or embodiments. In addition, in the accompanying drawings, like reference numerals denote corresponding members in the accompanying drawings, and may be used to indicate corresponding members used in more than one embodiment.

DESCRIPTION OF EMBODIMENTS

With reference to the accompanying drawings, the above described and other features of the present invention would be more apparent through the specification hereinafter. In the specification and accompanying drawings, specific embodiments of the present invention are disclosed, and some embodiments that may be practiced based on the principle of the present invention are illustrated. It should be understood that the present invention is not limited to the described embodiments. On the contrary, the present invention includes all modifications, variations and equivalents falling within the scope defined by the appended claims. In addition, for simplicity, a detailed description of the known art not directly related to the present invention is omitted to prevent confusion with the understanding of the present invention.

With reference to the accompanying drawings and specific embodiments, an RRC procedure monitoring method according to the present invention is described in detail hereinafter.

In the following description, an LTE mobile communication system and its subsequent evolved versions are used as exemplary application environments and an NB-IoT is used as an implementation scenario to set forth multiple embodiments of the present invention in detail. It is to be noted, however, that the present invention is not limited to the following embodiments and may be applicable to more other wireless communication systems, such as a future 5G cellular communication system.

Figure 1:
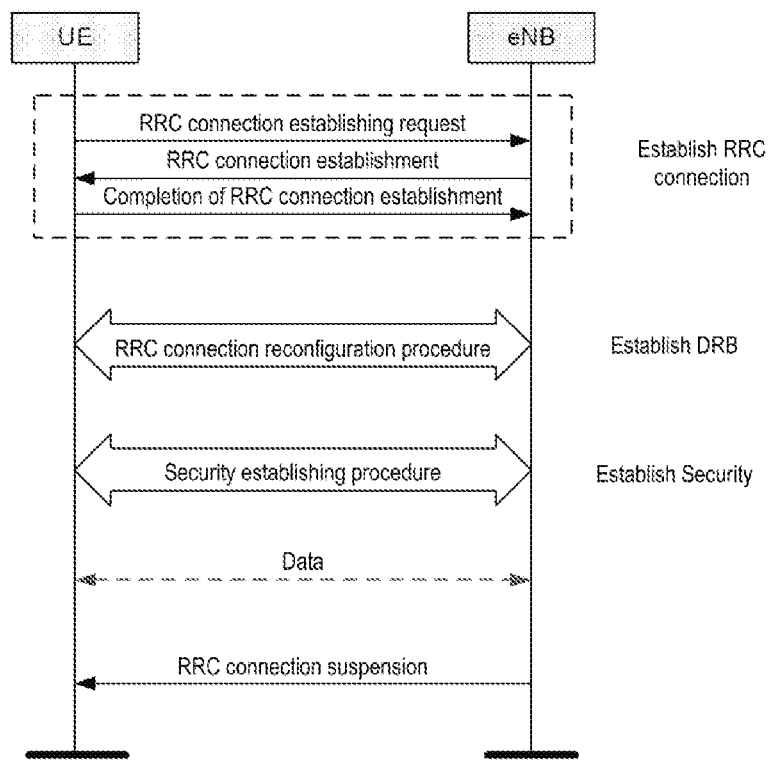
FIG. 1 is a schematic diagram of an RRC connection suspension.
Figure 2:
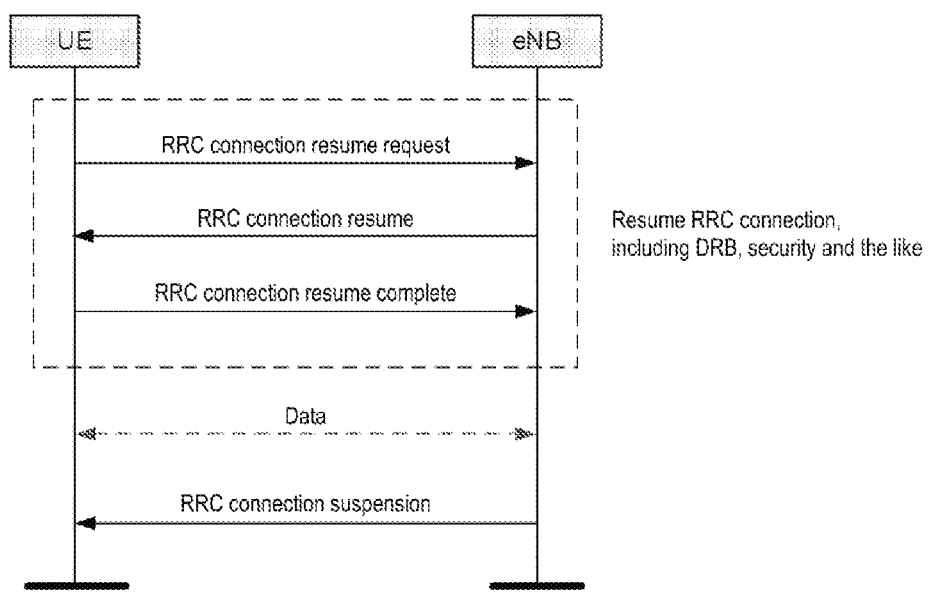
FIG. 2 is a schematic diagram of an RRC connection resume procedure.
Figure 3:
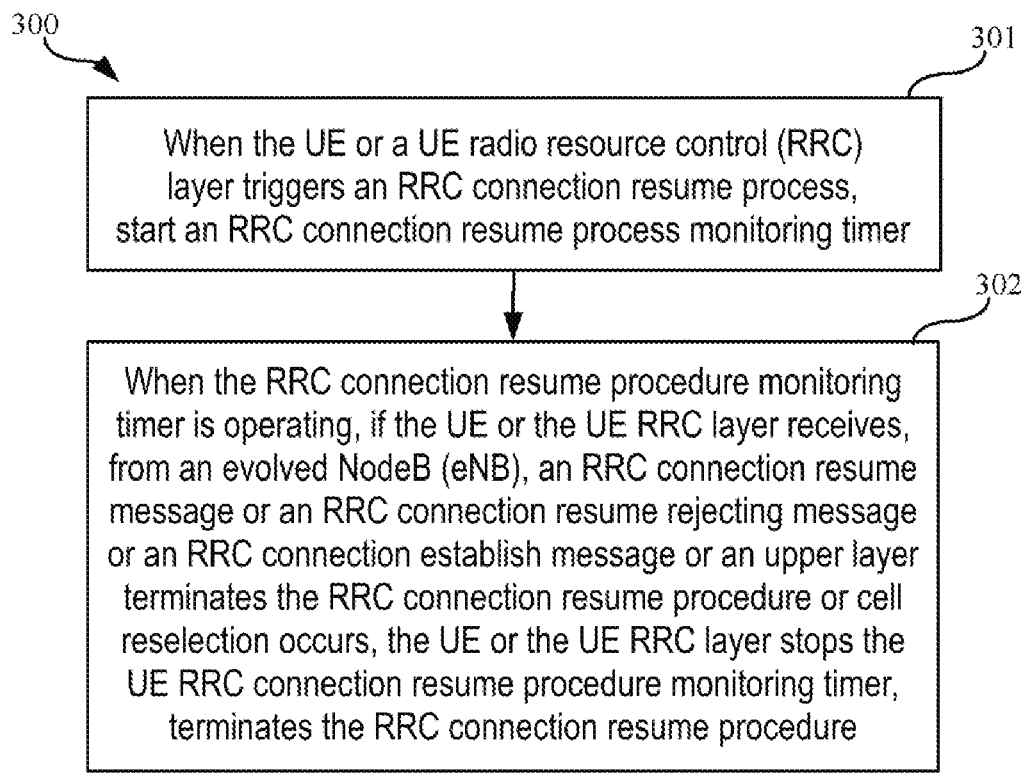
FIG. 3 is a flowchart of an RRC procedure monitoring method executed at a UE according to the present invention.

FIG. 3 is a flowchart illustrating an RRC procedure monitoring method 300 executed at a UE according to the present invention.

As shown, the method comprises step 301, wherein: when the UE or a UE radio resource control (RRC) layer triggers an RRC connection resume procedure, starting an RRC connection resume procedure monitoring timer. The method further comprises step 302, wherein: if the RRC connection resume procedure monitoring timer is running, upon the UE or the UE RRC layer receiving, from an evolved NodeB (eNB), an RRC connection resume message, an RRC connection resume rejecting message, or an RRC connection setup message or an upper layer terminating the RRC connection resume procedure or cell reselection occuring, the UE or the UE RRC layer stops the UE RRC connection resume procedure monitoring timer and terminates the RRC connection resume procedure, wherein the RRC connection resume message comprises configuration information for resuming the RRC connection when the eNB and the UE have stored UE context.

By setting the timer, the RRC procedure may be effectively monitored.

Hereinafter, Embodiments 1 to 6 of the present invention are described in detail.

Embodiment 1

Figure 4:
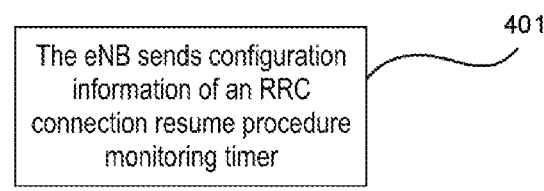
FIG. 4 is a schematic flowchart of configuration on a base station side according to Embodiment 1 of the present invention.

FIG. 4 is a flowchart of configuration on a base station side according to Embodiment 1 of the present invention.

Step 401: An eNB sends a configuration message, wherein the configuration message comprises configuration information of an RRC connection resume procedure monitoring timer, and the timer is configured to monitor an RRC connection resume procedure. The RRC connection resume procedure is used for resuming RRC connection when the eNB has stored UE context.

In this embodiment, the configuration information comprises a value of the timer. For example, using the timer named T308 as an example, the configuration information comprises a value 200 ms of the timer T308.

The configuration message sent by the eNB may be an RRC message. The configuration message may be, in one aspect, a system information message sent in a broadcast manner, for example, a second system information block (SIB 2), and in another aspect, a UE dedicated RRC message, for example, an RRC connection reconfiguration message, an RRC connection suspension message or the like. In addition, the configuration message may also be a medium access control (MAC) layer signaling, for example, a random access response or the like. Described above are only examples of implementation of the configuration message, but the configuration message is not limited thereto.

In this embodiment, the eNB may be an eNB based on the NB-IoT access technology, or may be an eNB of another type.

Figure 5:
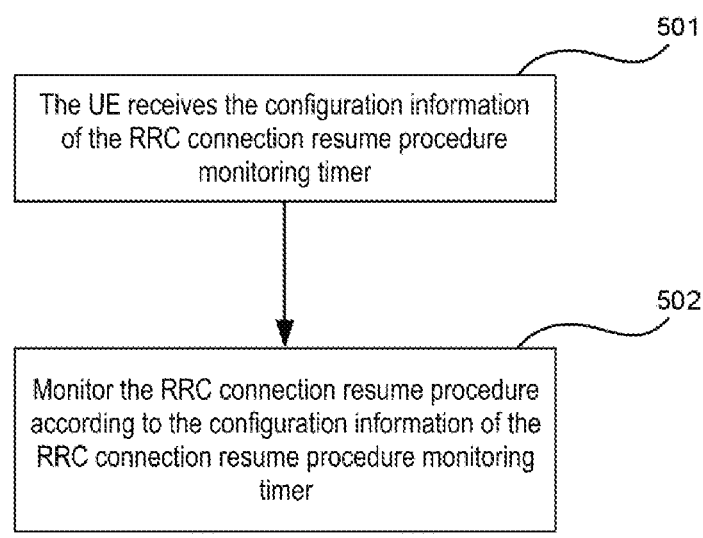
FIG. 5 is a schematic flowchart of configuration on a UE side according to Embodiment 1 of the present invention.

FIG. 5 is a flowchart of configuration on a UE side according to Embodiment 1 of the present invention.

Step 501: A UE receives a configuration message, wherein the configuration message comprises configuration information of an RRC connection resume procedure monitoring timer, and the timer is configured to monitor an RRC connection resume procedure. The RRC connection resume procedure is used for RRC connection resume when the UE has stored UE context.

In this embodiment, the configuration information comprises a value of the timer. For example, using the timer named T308 as an example, the configuration information comprises a value 200 ms of the tuner T308.

The configuration message received by the UE can be an RRC message. The configuration message may be a system information message sent in a broadcast manner, for example, a SIB 2. The configuration message may also be a UE dedicated RRC message, for example, an RRC connection reconfiguration message, an RRC connection suspension message, or the like. In addition, the configuration message may be a MAC signaling, for example, a random access response or the like. Described above are only examples of implementation of the configuration message, but the configuration message is not limited thereto.

In this embodiment, the UE may be an NB-IoT UE, or may be a non-NB-IoT UE of another type.

Step 502: The UE uses the received configuration information of the RRC connection resume procedure monitoring timer, and monitors the RRC connection resume procedure according to the timer configuration information. The specific implementation of monitoring the RRC connection resume procedure by the UE according to the timer is illustrated in Embodiments 2 to 5, but is not limited thereto.

Figure 6:
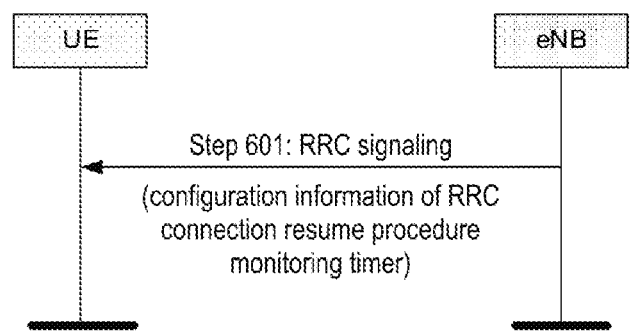
FIG. 6 is a schematic flowchart of information interaction between a base station and a UE according to Embodiment 1 of the present invention.

FIG. 6 is a flowchart of information interaction between a base station and a UE according to Embodiment 1 of the present invention.

Step 601: An eNB sends a configuration message to a UE. The configuration message comprises configuration information of an RRC connection resume procedure monitoring timer, and the timer is configured to monitor an RRC connection resume procedure. The UE receives and uses the received configuration information of the RRC connection resume procedure monitoring timer, and monitors the RRC connection resume procedure according to the timer configuration information. The RRC connection resume procedure is used for RRC connection resume when the eNB and the UE have stored UE context.

In this embodiment, the configuration information comprises a value of the timer. For example, using the timer named T308 as an example, the configuration information comprises a value 200 ms of the timer T308.

The configuration message may be an RRC message. The configuration message may be a system information message sent in a broadcast manner, for example, a SIB 2. The configuration message may also be a UE dedicated RRC message, for example, an RRC connection reconfiguration message, an RRC connection suspension message, or the like. In addition, the configuration message may be a MAC signaling, for example, a random access response or the like. Described above are only examples of implementation of the configuration message, but the configuration message is not limited thereto.

In this embodiment, the specific implementation of monitoring the RRC connection resume procedure by the UE according to the timer is illustrated in Embodiments 2 to 5, but is not limited thereto.

In this embodiment, the UE may be an NB-IoT UE, or may be a non-NB-IoT UE of another type.

Optionally, upon successfully receiving the configuration message, the UE sends a response message to the eNB. For example, if the configuration message is an RRC connection reconfiguration message, the UE may return an RRC connection reconfiguration completion message as a response.

Embodiment 2

Figure 7:
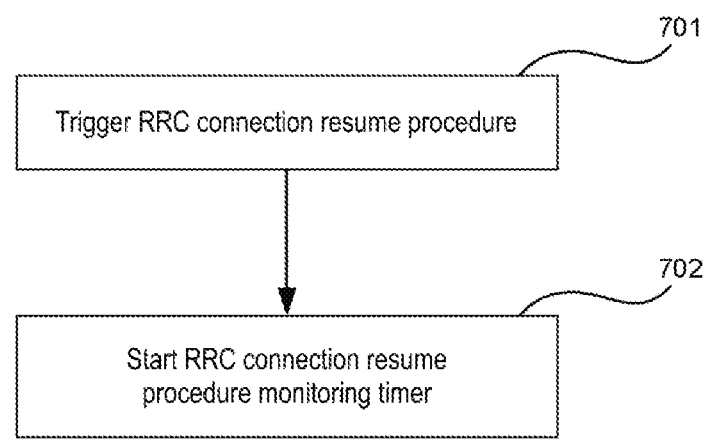
FIG. 7 is a schematic flowchart of processing on a UE side according to Embodiment 2 of the present invention.

FIG. 7 is a flowchart of processing on a UE side according to Embodiment 2 of the present invention. This embodiment provides an RRC connection resume procedure monitoring method on a UE side according to configuration information of an RRC connection resume procedure monitoring timer.

Step 701: A UE or a UE RRC layer triggers an RRC connection resume procedure. The RRC connection resume procedure is used for RRC connection resume when the UE has stored UE context.

Step 702: The UE or the UE RRC layer starts an RRC connection resume procedure monitoring timer. The timer is configured to monitor the RRC connection resume procedure.

In this embodiment, the UE may be an NB-IoT UE, or may be a non-NB-IoT UE of another type.

Embodiment 3

Figure 8:
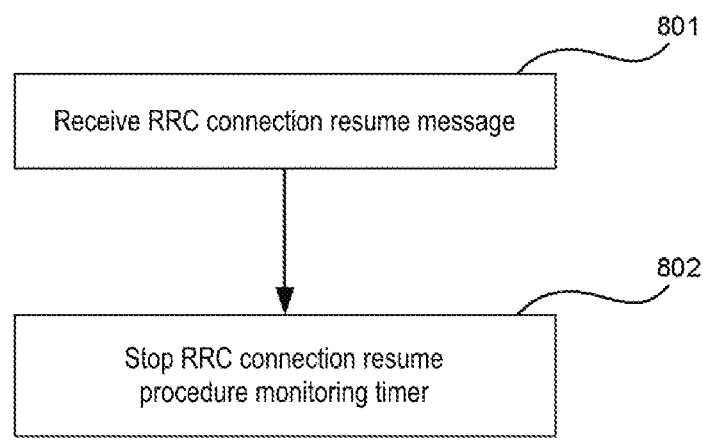
FIG. 8 is a schematic flowchart of processing on a UE side according to Embodiment 3 of the present invention.

FIG. 8 is a flowchart of processing on a UE side according to Embodiment 3 of the present invention. This embodiment provides an RRC connection resume procedure monitoring method on a UE side according to configuration information of an RRC connection resume procedure monitoring timer.

Step 801: A UE or a UE RRC layer receives an RRC connection resume message, an RRC connection setup message, or an RRC connection resume rejecting message; or an upper layer aborts an RRC connection resume procedure; or cell reselection occurs. The RRC connection resume message is sent by an eNB, and comprises configuration information for resuming the RRC connection when the eNB and the UE have stored UE context. The RRC connection resume rejecting message is sent by the eNB, and is used for rejecting an RRC connection resume request from the UE.

Step 802: The UE or the UE RRC layer stops an RRC connection resume procedure monitoring timer. The timer is configured to monitor the RRC connection resume procedure.

Optionally, if step 801 is that, the UE or the UE RRC layer receives the RRC connection resume message or the RRC connection setup message, step 802 further comprises returning a response message and terminating the RRC connection resume procedure.

Optionally, if step 801 is that the UE or the UE RRC layer receives the RRC connection resume rejecting message or cell reselection occurs, step 802 further comprises the UE or the UE RRC layer considering that the RRC connection resume procedure fails and informing the failure of the RRC connection resume procedure to the upper layer.

Optionally, if step 801 is that the UE or the UE RRC layer receives the RRC connection resume rejecting message or the RRC connection setup message, or the upper layer aborts the RRC connection resume procedure, step 802 further comprises discarding the UE context by the UE or the UE RRC layer.

In this embodiment, the UE may be an NB-IoT UE, or may be a non-NB-IoT UE of another type.

Embodiment 4

Figure 9:
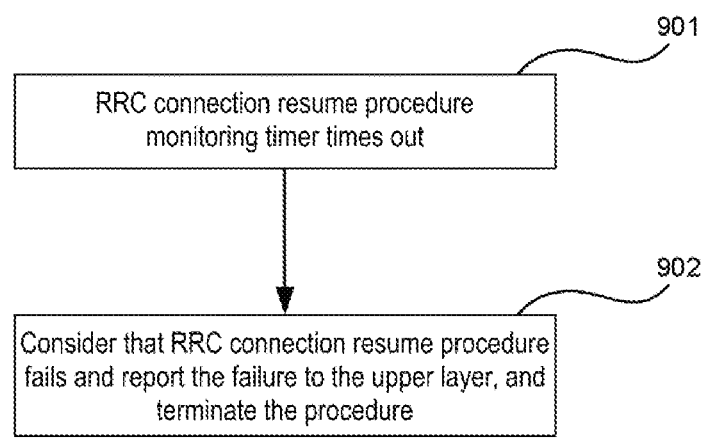
FIG. 9 is a schematic flowchart of processing on a UE side according to Embodiment 4 of the present invention.

FIG. 9 is a flowchart of processing on a UE side according to an embodiment of the present invention. This embodiment provides an RRC connection resume procedure monitoring method on a UE side according to configuration information of an RRC connection resume procedure monitoring timer.

Step 901: An RRC connection resume procedure timer expires. The timer is configured to monitor the RRC connection resume procedure.

Step 902: A UE performs the following actions:

Action 1: The UE or a UE RRC layer considers that the RRC connection resume procedure fails.

Action 2: The UE RRC layer notifies an upper layer that the RRC connection resume procedure fails.

Action 3: The UE or the UE RRC layer discards the stored UE context.

Action 4: The UE or the UE RRC layer or a UE non-access stratum (NAS) layer triggers an RRC connection setup procedure.

Action 5: A MAC layer is reset.

In this step, actions 1 to 5 may be optional, that is, the UE may perform one or a plurality of actions 1 to 5. Typically, the UE performs actions 1 to 2, that is, the UE or the UC RRC layer considers that the RRC connection resume procedure fails and notifies the failure of the RRC connection resume procedure to the upper layer.

In this embodiment, the UE may be an NB-IoT UE, or may be a non-NB-IoT UE of another type.

Embodiment 5

Figure 10:
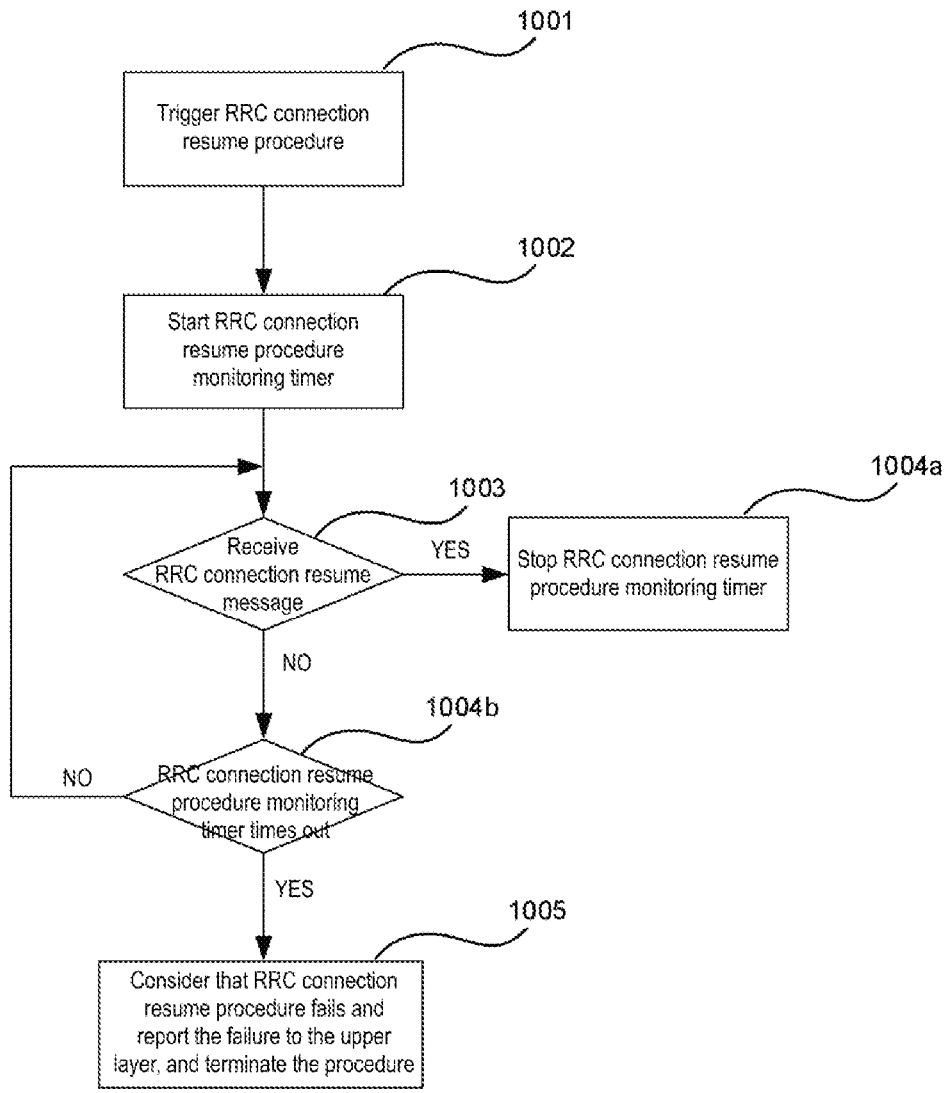
FIG. 10 to FIG. 12 are schematic flowcharts of processing on a UE side according to Embodiment 5 of the present invention.

FIG. 10 is a flowchart of processing on a UE side according to an embodiment of the present invention. This embodiment provides an RRC connection resume procedure monitoring method on a UE, side according to configuration information of an RRC connection resume procedure monitoring timer.

Step 1001: A UE or a UE RRC layer triggers an RRC connection resume procedure.

The RRC connection resume procedure is used for RRC connection resume when the UE has stored UE context.

Step 1002: The UE or the UE RRC layer starts an RRC connection resume procedure monitoring timer.

The timer is configured to monitor the RRC connection resume procedure.

Step 1003: The UE or the UE RRC layer determines whether an RRC connection resume message, an RRC connection setup message, or an RRC connection resume rejecting message is received; or whether an upper layer aborts the RRC connection resume procedure; or whether cell reselection occurs. If the judgment is positive, step 1004*a* is performed; and otherwise, step 1004*b* is performed.

The RRC connection resume message is sent by an eNB, and comprises configuration information for resuming the RRC connection when the UE has stored UE context. The RRC connection resume rejecting message is sent by the eNB, and is used for rejecting an RRC connection resume request from the UE.

Step 1004*a*: The UE or the UE RRC layer stops an RRC connection resume procedure monitoring timer.

Optionally, if step 1003 is that the UE or the UE RRC layer receives the RRC connection resume message or the RRC connection setup message, step 1004*a* further comprises returning a response message and terminating the RRC connection resume procedure.

Optionally, if step 1003 is that the UE or the UE RRC layer receives the RRC connection resume rejecting message or cell reselection occurs, step 1004*a* further comprises the UE or the UE RRC layer considering that the RRC connection resume procedure fails and informing the failure of the RRC connection resume procedure to the upper layer.

Optionally, if step 1003 is that the UE or the UE RRC layer receives the RRC connection resume rejecting message or the RRC connection setup message, or the upper layer aborts the RRC connection resume procedure, step 1004*a* further comprises the UE or the UE RRC layer discarding the UE context.

Step 1004*b*: Determine whether the connection resume procedure timer is in expired status. If so, step 1005 is performed; if not, step 1003 is performed.

Step 1005: A UE performs the following actions:

Action 1: The UE or a UE RRC layer considers that the RRC connection resume procedure fails.

Action 2: The UE RRC layer notifies an upper layer that the RRC connection resume procedure falls.

Action 3: The UE or the UE RRC layer discard the stored UE context.

Action 4: The UE or the UE RRC layer or a UE NAS layer triggers an RRC connection setup procedure.

Action 5: A MAC layer is reset.

In this step, actions 1 to 5 may be optional, that is, the UE may perform one or a plurality of actions 1 to 5. Typically, the UE performs actions 1 to 2, that is, the UE or the UC RRC layer considers that the RRC connection resume procedure fails and notifies the failure of the RRC connection resume procedure to the upper layer.

In this embodiment, the UE may be an NB-IoT UE, or may be a non-NB-IoT UE of another type.

A person skilled in the art will understand that the method as illustrated in FIG. 10 is illustrative rather than limitative. Specifically, the method is practiced without depending on the specific sequence of performing the operations as illustrated in FIG. 10.

Figure 11:
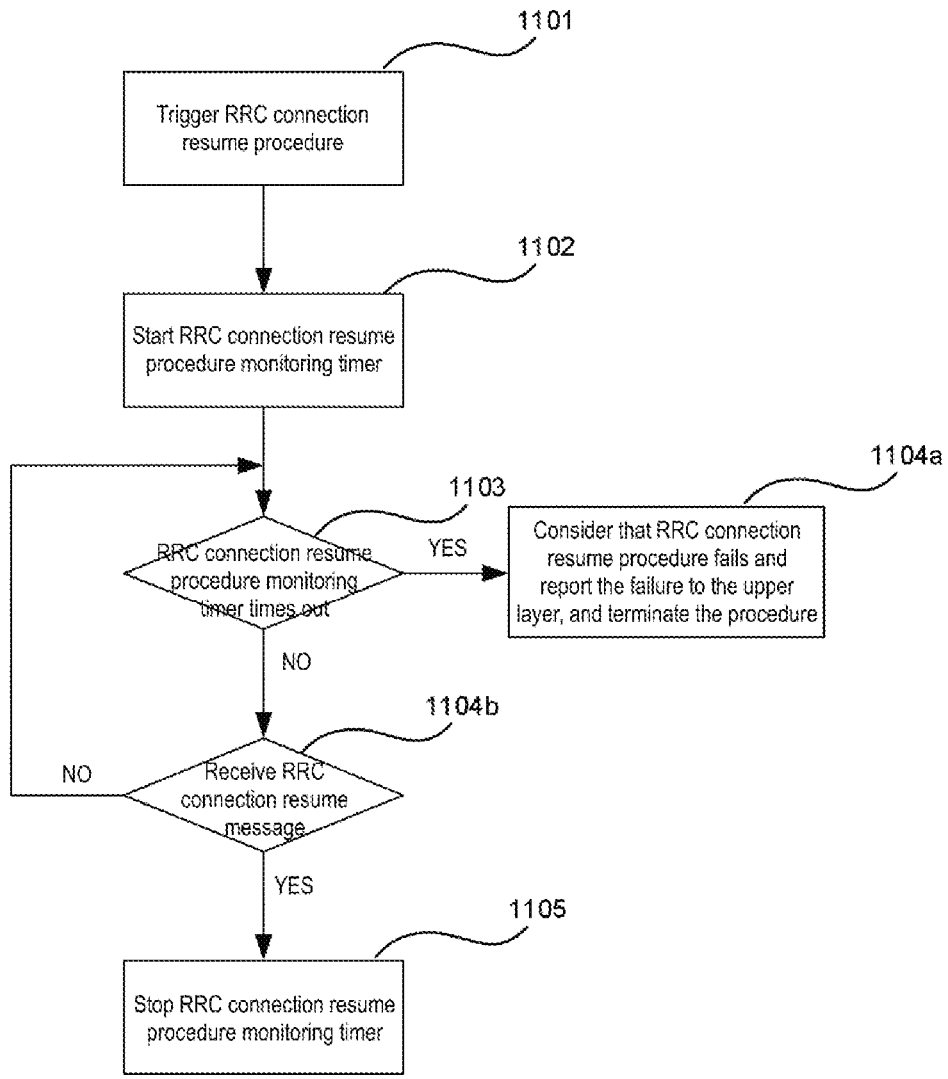
Figure 12:
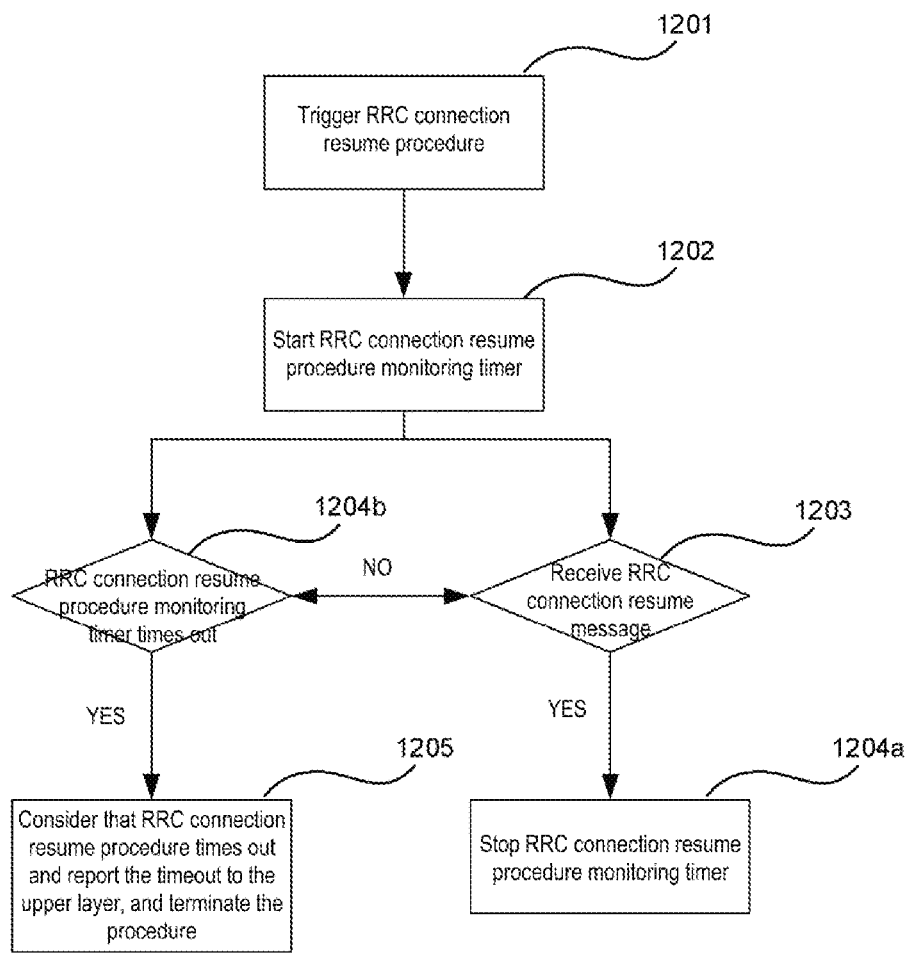

For example, FIG. 11 illustrates the scenario of first performing the step of determining whether the RRC connection resume procedure timer expires, and next, determining whether the UE or the UE RRC layer receives the RRC connection resume message or the RRC connection setup message or the RRC connection resume rejecting message, or whether the upper layer aborts the RRC connection resume procedure, or whether cell reselection occurs are performed. FIG. 12 illustrates the scenario of first performing the step of determining whether the RRC connection resume procedure timer is in expired status and determining whether the RRC connection resume procedure timer is in expired status, and next, the step of determining whether the UE or the UE RRC layer receives the RRC connection resume message or the RRC connection setup message or the RRC connection resume rejecting message, or whether the upper layer aborts the RRC connection resume procedure, and or whether cell reselection occurs are parallelly performed.

Embodiment 6

Figure 13:
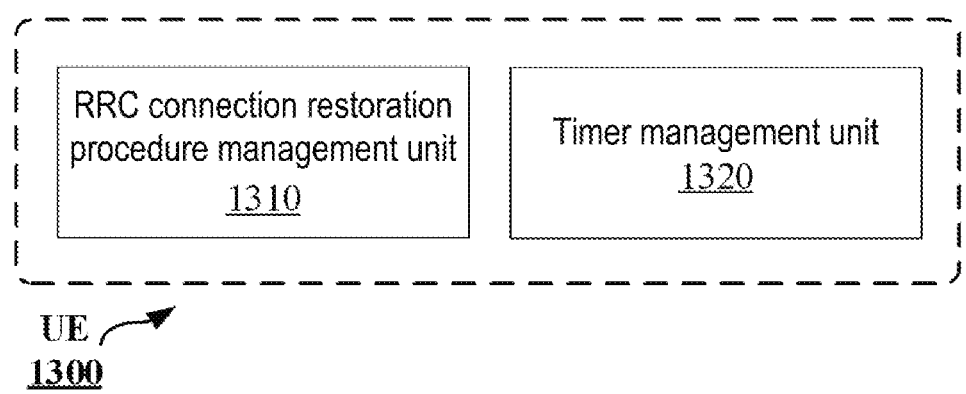
FIG. 13 is a schematic structural diagram of a UE according to Embodiment 6 of the present invention.

FIG. 13 is a schematic structural diagram of a UE 1300 according to Embodiment 5 of the present invention. As shown, the UE 1300 comprises an RRC connection resume procedure management unit 1310 and a timer management, unit 1320. The RRC connection resume procedure management unit 1310 is configured to trigger an RRC connection resume procedure. The timer management unit 1320 is configured to start an RRC connection resume procedure monitoring timer when the RRC connection resume procedure is triggered. The RRC connection resume procedure management unit 1310 is further configured to do the following: When the RRC connection resume procedure monitoring timer is running, if the UE or the UE RRC layer receives, from an evolved NodeB (eNB), an RRC connection resume message, an RRC connection resume rejecting message, or an RRC connection setup message or an upper layer aborts the RRC connection resume procedure or cell reselection occurs, terminate the RRC connection resume procedure, wherein the RRC connection resume message comprises configuration information for resuming the RRC connection when the eNB and the UE have stored UE context. The timer management unit 1320 is further configured to do the following: when the RRC connection resume procedure monitoring timer is running, if the UE or the UE RRC layer receives, from an evolved. NodeB (eNB), an RRC connection resume message, an RRC connection resume rejecting message, or an RRC connection setup message or an upper layer aborts the RRC connection resume procedure or cell reselection occurs, stopping the UE RRC connection resume procedure monitoring timer.

Optionally, the UE further comprises: a receiving unit, configured to receive a configuration message comprising a value of the timer from the eNB.

It should be understood that the above embodiments of the present invention may be implemented through software, hardware or a combination of software and hardware. For example, various components of the base station and user equipment in the above embodiments can be realized through multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments of the present invention, disclosed here, may be implemented on a computer program product. More specifically, the computer program product is a product described as below. The product has a computer-readable medium on which a computer program logic is encoded. The computer program logic provides relevant operations to implement the above-described technical solution of the present invention when the product is executed on a computing equipment. The computer program logic enables a processor to execute the operations (methods) described in the embodiments of the present invention when the product is executed on at least one processor of a computing system. Such an arrangement of the present invention is typically provided as software, a code, and/or other data structures that are configured or encoded on a computer-readable medium, such as a light medium (e.g., a CD-ROM), a floppy disk or a hard disk, or, for example, firmware or other media of microcodes on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present invention.

Although the present invention has been shown in connection with the preferred embodiments of the present invention, it will be understood by those skilled in the art that various modifications, substitutions and alterations may be made therein without departing from the spirit and scope of the present invention. Accordingly, the present invention should not be defined by the above-described embodiments, but should be defined by the appended claims and their equivalents.

The invention claimed is:
1. A method performed by a User Equipment (UE), comprising:
    starting a timer, upon initiating procedure for resuming a radio resource control (RRC) connection;
    discarding a UE context, stopping the timer, transmitting a response message, and ending the procedure, if an RRCConnectionSetup message is received during the procedure; and
    stopping the timer, transmitting a response message, and ending the procedure, if an RRCConnectionResume message is received.
2. The method of claim 1, further comprising:
    performing an RRC layer processing for informing an upper layer about a failure to resume the RRC connection, if the timer expires.
3. The method of claim 1, further comprising:
    determining whether an RRC connection resume request is rejected or not on a basis of whether a message received in the procedure is the RRCConnectionResume message, the RRCConnectionSetup message, or an RRC message for rejecting the RRC connection resume request.
4. A User Equipment (UE), comprising:
    receiving circuitry configured to receive an RRCConnectionSetup message or an RRCConnectionResume message; and
    processing circuitry configured to start a timer, upon initiating procedure for resuming a radio resource control (RRC) connection, wherein
    the processing circuitry discards a UE context, stops the timer, transmits a response message, and ends the procedure, if the receiving circuitry receives the RRCConnectionSetup message during the procedure, and the processing circuitry stops the timer, transmits a response message, and ends the procedure, if the receiving circuitry receives the RRCConnectionResume message.

5. The UE of claim 4, wherein:
the processing circuitry performs an RRC layer processing for informing an upper layer about a failure to resume the RRC connection, if the timer expires.

6. The UE of claim 4, wherein:
the processing circuitry determines whether an RRC connection resume request is rejected or not on a basis of whether a message received in the procedure is the RRCConnectionResume message, the RRCConnectionSetup message, or an RRC message for rejecting the RRC connection resume request.

7. A method performed by a base station, comprising:
transmitting, to a User Equipment (UE), an RRCConnectionSetup message; and
transmitting, to the UE, an RRCConnectionResume message, wherein
the RRCConnectionSetup message causes the UE, in a case that the UE has initiated procedure for a radio resource control (RRC) connection resume and has started a timer, to discard a UE context, stop the timer, transmit a response message, and end the procedure, and
the RRCConnectionResume message causes the UE, in a case that the UE has initiated the procedure and has started the timer, to stop the timer, transmit a response message, and end the procedure.

8. A base station, comprising:
generating circuitry configured to generate an RRCConnectionSetup message; and
transmitting circuitry configured to transmit, to a User Equipment (UE), the RRCConnectionSetup message, wherein
the generating circuitry is further configured to generate an RRCConnectionResume message,
the transmitting circuitry is further configured to transmit, to the UE, the RRCConnectionResume message,
the RRCConnectionSetup message causes the UE, in a case that the UE has initiated procedure for a radio resource control (RRC) connection resume and has started a timer, to discard a UE context, stop the timer, transmit a response message, and end the procedure, and
the RRCConnectionResume message causes the UE, in a case that the UE has initiated the procedure and has started the timer, to stop the timer, transmit a response message, and end the procedure.

* * * * *